Jan. 3, 1933.   E. M. MUELLER   1,892,846
CAMERA
Filed July 5, 1928   3 Sheets-Sheet 3
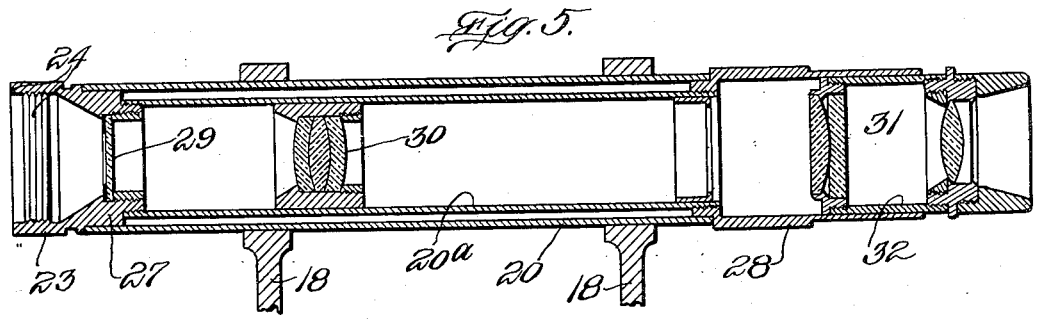
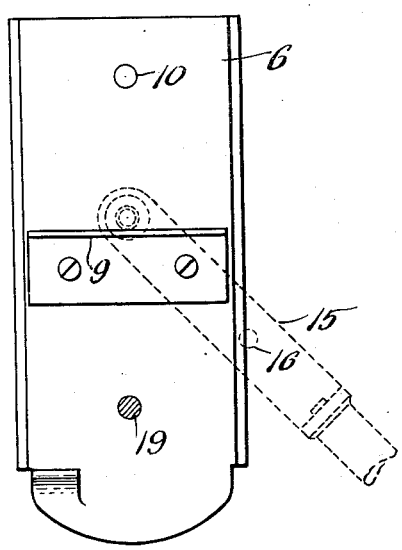
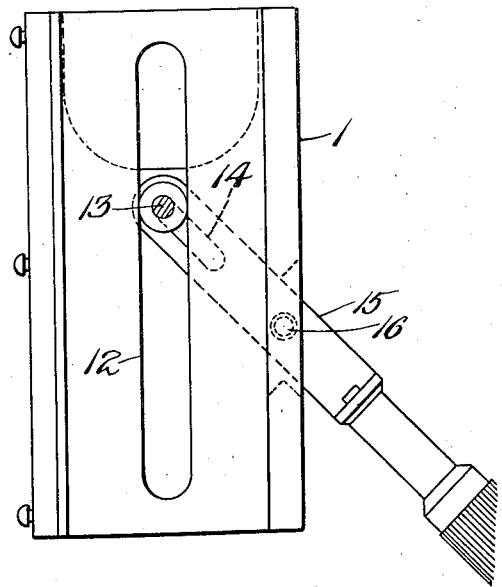
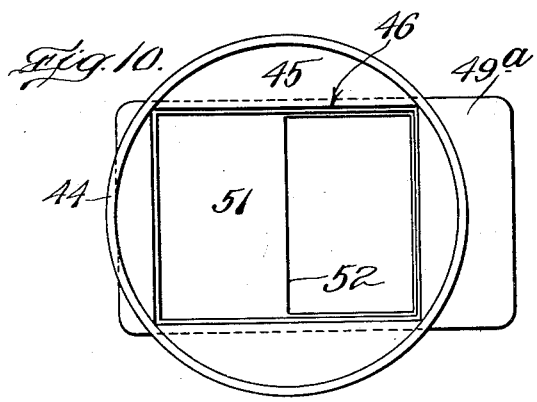
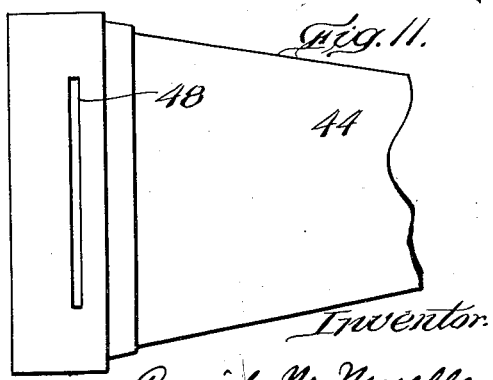

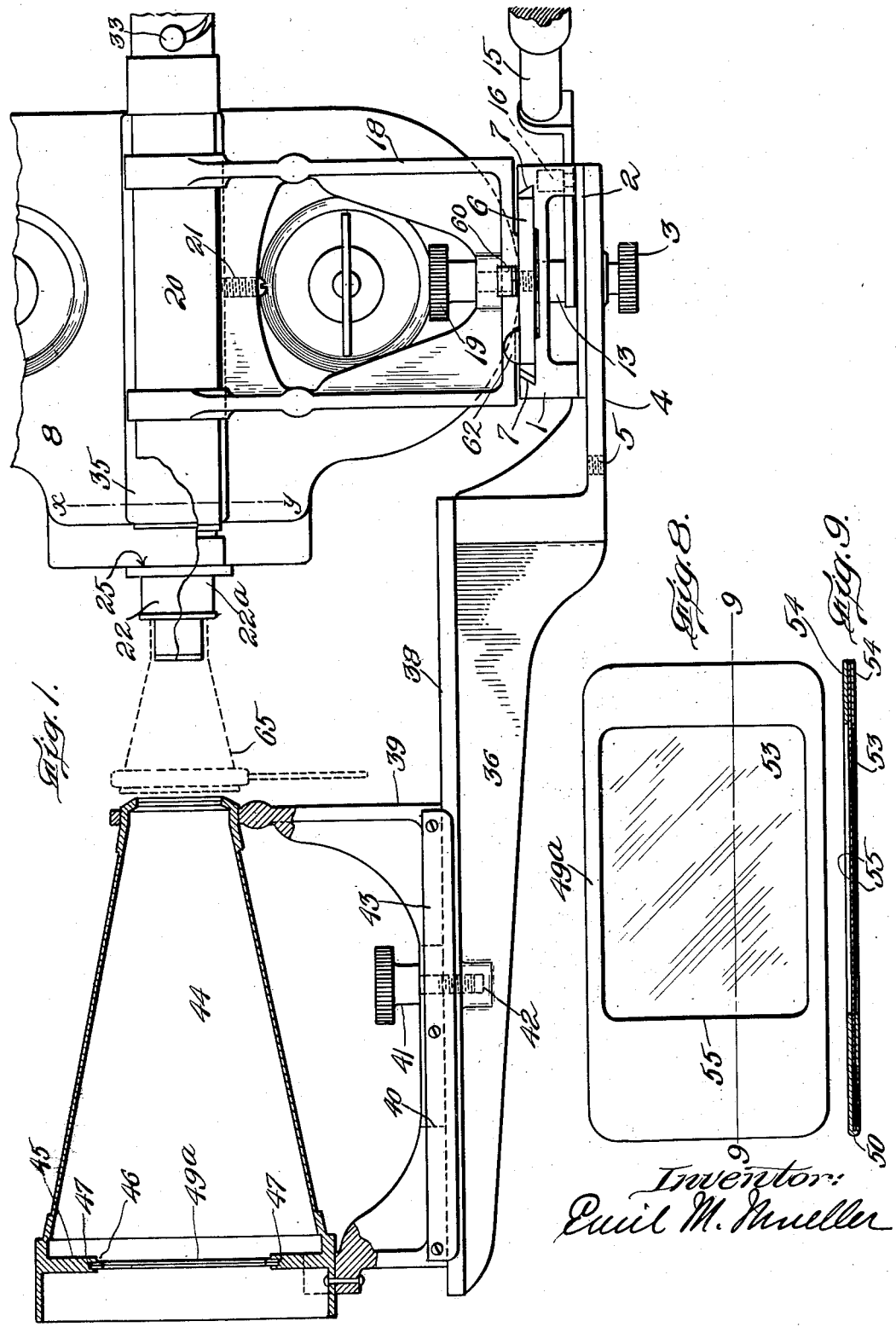

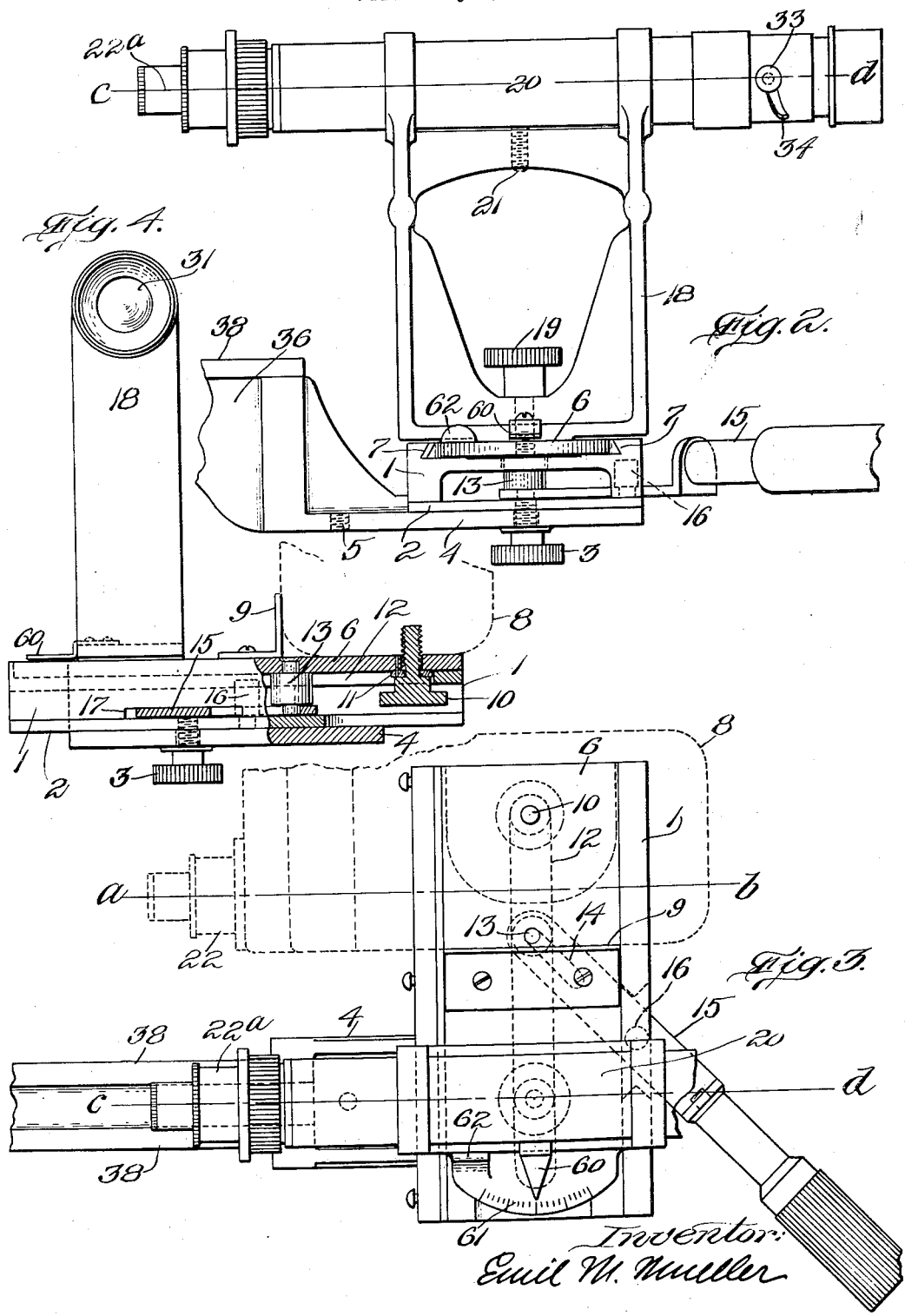

Patented Jan. 3, 1933

1,892,846

UNITED STATES PATENT OFFICE

EMIL M. MUELLER, OF NEW YORK, N. Y., ASSIGNOR TO C. P. GOERZ AMERICAN OPTICAL COMPANY, OF NEW YORK, N. Y., A CORPORATION OF NEW YORK

CAMERA

Application filed July 5, 1928. Serial No. 290,351.

This invention relates to cameras and it has for its object to provide improved means for use in supporting and focusing the same. A further object of the invention is to provide a novel camera supporting attachment for application to tripods by means of which a camera can be quickly and accurately focused, and to provide a focusing attachment of this type particularly adapted for use with motion picture cameras and which can be used both for focusing the camera and also for finder and tilting purposes.

To these ends I have provided camera supporting means including a camera base consisting of two parts one of which is connected with the camera and movably mounted upon the other part which is stationarily supported, preferably by means of a tripod. On the movable section of the base with which the camera is connected is provided focusing means whose optical axis is horizontally disposed and offset at one side with respect to the optical axis of the camera, and preferably also disposed in the same horizontal plane with said optical axis of the camera. The movable section of the base is connected with the stationary section thereof so that it can be shifted on the latter horizontally cross-wise of the axes of the focusing means and camera, means being provided to limit the movement of the movable section of the base so that the extent of movement thereof is the same as the offset distance between the optical axis of the camera and the optical axis of said focusing means.

The focusing means of the movable section of the base may be, and preferably is, independent of the camera per se, and this focusing means includes a focusing lens mount which may be the focusing lens mount of the camera transferred from the camera to said focusing means when the latter is to be used, and then transferred back to the camera again when the latter is to be used. Or it may be an adjustable focusing lens mount that is a matched duplicate of the camera lens mount, the latter remaining a permanent part of the camera.

In other words a single interchangeable focusing lens mount may be provided that is transferred from the camera to the focusing means and from the focusing means back to the camera again, or a pair of matched focusing lens mounts may be employed, one as a permanent part of the focusing means and the other as a permanent part of the camera.

When two duplicate matched focusing lens mounts are employed, each is provided as usual with a focusing index, and one lens mount is used as a permanent part of the focusing means while the other lens mount is used as a permanent part of the camera, the focal axes of the two being in the same horizontal plane, with the lens mount of the focusing means offset directly opposite the position of the lens mount of the camera.

Thus after performing the focusing operation with the movable section of the base occupying a position at the limit of its movement in one direction, the lens mount of the camera is adjusted to accord with the reading on the index of the focusing lens mount and then the movable section of the base is shifted to the limit of its movement in the opposite direction thus bringing the optical axis of the camera into coincidence with the identical position that was occupied by the axis of the focusing means while the focusing operation was being carried out, and bringing the camera lens mount into the identical position that was occupied by the lens mount of the focusing and finder means. When a single interchangeable lens mount is employed the focusing operation is carried out with the same incorporated as part thereof after which the mount is transferred to the camera and the movable section of the base adjusted to place the camera in position for the exposure.

Other objects and features of my invention are hereinafter pointed out.

In the accompanying drawings:

Figure 1 is a side elevation of a portion of a motion picture camera provided with a support constructed in accordance with my invention.

Figure 2 shows some of the parts of Figure 1 detached or separately.

Figure 3 is a plan view, partly broken away, of my new camera support.

Figure 4 is a rear elevation, partly in section, of the camera support shown in Figures 2 and 3.

Figure 5 is a central vertical longitudinal sectional view of the focusing and finder means but with the focusing lens thereof removed.

Figure 6 is a plan view of the movable section of the base hereinafter described.

Figure 7 is a plan view of the stationary section of the base.

Figure 8 is an elevation of the title slide hereinafter described.

Figure 9 is a section on line 9—9 of Figure 8.

Figure 10 is a front end view of the mask box hereinafter described.

Figure 11 is a side elevation of a portion of the mask box.

The embodiment of my invention herein illustrated is a motion picture camera apparatus including a camera supporting attachment for application to a tripod of ordinary construction, said attachment being made with a base comprising a stationary section adapted to be connected with the tripod and a movable section mounted thereon and slidably connected with said stationary section. The stationary section of the camera base includes a metal body member 1 to the under side of which is fastened by screws or the like, a plate 2 having a threaded aperture to receive a screw 3 by means of which it is securely and immovably fastened to a bracket 4. This bracket 4 is provided with a threaded aperture 5 to receive the usual screw provided at the top of a tripod.

The movable section of the camera base includes a slide or carriage 6 mounted in dovetailed ways 7 provided on section 1. The top of slide 6 provides a seat for a moving picture camera 8 of ordinary construction, said camera being secured in position thereon with one side against a gage 9, by means of a thumb screw 10. This screw 10 extends upwardly through an aperture provided in slide 6 and its threaded end is screwed into the usual threaded hole provided at the lower end of the camera 8. Screw 10 is swivelly connected with slide 6 by means of an interiorly threaded collar 11 secured in position against the under side of said slide 6. Thus the screw 10, whose shank is made with an unthreaded portion near its head, remains in position when the camera 8 is removed, but is at all times free to be rotated, to be engaged with, or disengaged from, the latter.

The screw 10 extends downwardly from slide 6 through a slot 12 provided in the top wall of the body member 1. The slide 6 is also provided with a stud 13 which likewise extends downwardly through the slot 12 of the top wall of member 1. The lower end of stud 13 occupies a slot 14 provided in one arm of a lever 15 fulcrumed at 16 upon the member 1, said base member being made with a slot 17, Figure 4, through which lever 15 extends. The base section 1—2 is made hollow as shown so that the lever 15 extends through the slot 17 into the interior thereof where it is engaged with the stud 13 as described.

The outer arm of lever 15 is made as a handle whereby it is manually operated. When this lever 15 is swung on fulcrum 16 to the limit of its movement in one direction the slide 6 is shifted on member 1 to the limit of its movement in one direction, and when said lever is swung in the opposite direction the slide 6 is shifted on member 1 to the limit of its movement in that direction. The movements of the lever 15 and slide 6 in both directions are limited by the engagement of stud 13 with the end of slot 14.

Focusing and finder means is provided on the slide 6 including an upstanding bracket 18 pivotally secured in position upon the top side of slide 6 by means of a centrally disposed thumb screw 19 whose axis, extended upwardly, intersects the axis of a metal tube 20. This tube 20 is fitted within apertures provided at the top of bracket 18 and secured therein with provision for longitudinal adjustment by means of a set screw 21.

The axis of the tube 20 is the same distance above the top side of slide 6, Figure 1, as is the optical axis of the camera 8 and the axis $c-d$ of tube 20, Figure 3, is offset laterally from the optical axis $a-b$, of camera 8, a distance which is the same as the range or extent of movement of slide 6 when shifted from one extreme position to the opposite. Thus by movement of the operating lever 15, in one direction, the optical axis $a-b$ of camera 8 may be shifted laterally from the position in which it is shown in Figure 3 of the drawings into the position occupied by the axis of tube 20 in said figure. Also it will be clear that movement of lever 15 in the opposite direction will restore the parts to the positions shown in Figure 3. Thus by reciprocation of slide 6 either the camera 8 or the tube 20 may be placed in an intermediate operative position into and out of which each is shifted when said lever is operated.

The camera 8 is provided, as usual, with a focusing lens mount 22 which, also as usual, is removable so that it may be transferred to the front end of the tube 20, said front end of tube 20 being provided with an end member 27 that is interiorly threaded as at 23 to receive the same, and that is provided with a lens mount seat 24 that is in the same vertical plane with the lens mount seat 25 on camera 8. Or the tube 20 may be permanently provided at its forward end with an adjustable focusing lens mount 22a as shown in Figures 1 and 2, said lens mount 22a being omitted from the other figures of the drawings, and being a matched duplicate of the lens mount 22.

When two separate lens mounts are employed as shown and described they will each, as usual, be provided with an index so that after operating and adjusting the focusing and finder means including the tube 20, the lens mount 22 may be set or adjusted by means of its index according to the setting indicated by the index of the lens mount 22a of the tube 20.

The tube 20 serves as a holder for the focusing and finder means, the latter including an inner tube 20a having threaded engagement at its front end with the end member 27 which is telescopically fitted within the holder tube 20, and having threaded engagement at its rear end with another tubular end member 28 that is telescopically fitted within the adjacent end of holder tube 20. Within the inner tube 20a is a properly masked ground glass 29 and a reversing lens system 30 while the end member 28 has adjustably supported within it an aplanatic magnifying ocular 31 for viewing the image on the ground glass 29 after rectifying reversal by lens system 30. The magnifying ocular 31 includes a tubular metallic body 32 carrying lenses, said body being provided with a stud 33 extending through a spiral slot 34 provided in end member 28 so that by rotation of the tubular body 32 these lenses may be adjusted toward and from, and thereby focused upon, the ground glass 29 as seen through lenses 30.

The holder tube 20 of the focusing and finder means is a permanent part of the upright bracket 18 but the inner tube 20a together with the parts carried by, and connected with it, are removable from the holder tube 20 and may be mounted within the usual finder compartment 35 on camera 8 when desired.

The bracket member 4 of the stationary base section is made upon its front side with a forwardly and horizontally extending arm 36 formed upon its top side with ways 38 on which is mounted an upstanding bracket 39. The base portion of this bracket 39 is made with a longitudinal slot 40 to accommodate a set screw 41 that engages a tapped hole 42 provided in arm 36. The slot 40 provides for adjustment of the bracket 39 on arm 36 forwardly and rearwardly so that it may be accurately positioned with relation to the camera when the latter occupies its operative position referred to above. The screw 41 serves as means for fixing the bracket 39 in adjusted position. The bracket 39 has fastened to its opposite sides depending plates, one of which is shown at 43, said plates embracing and engaging the ways 38 so that they position the bracket laterally on arm 38 and guide it lengthwise thereof when adjusted as described.

The bracket 39 has permanently mounted on it a mask box 44 which is herein shown as a hollow conical structure having its axis arranged within the same horizontal plane as the optical axis of the camera 8 and the axis of tube 20, and also directly in front and in alignment with the axis c—d, Figure 3, the smaller end of box 44 being adjacent to the camera. The larger outer end of the box 44 is constructed with a vertical partition or wall 45 made at its middle with an oblong aperture 46. This wall 45 is made at the top and bottom of the aperture 46 with ways 47 which, at one side of the box 44, Figures 10 and 11, open into a slot 48 provided in the side wall of the box 44. The ways 47 and slot 48 are provided to receive various kinds of slides or masks for the making of double exposures, inserts, titles, illusions, etc. The particular construction of these slides will depend entirely on the desired effects to be secured and must, therefore, be worked out and made by the camera man, but each will be of proper outside shape and dimensions to be slid edgewise through the slot 48 into position within the ways 47 so as to occupy the exposure opening or aperture 46. A mask slide of the kind referred to, suitable for making a double exposure, is illustrated in position in Figure 10. This mask slide consists of a rectangular piece of opaque sheet material 51 provided near one end with an aperture 52. When this mask slide is placed within the box 44 by sliding it into position through the slot 48, it serves to blanket or close a portion of the exposure aperture 46 at one side thereof.

In Figures 8 and 9 I have illustrated a slide for use in producing titles or hand drawn sketches upon the film strip, and this slide is made from a strip of sheet material, preferably metal folded transversely upon itself at its middle to provide a holder for a panel 53 which may be made from tracing cloth, paper or other translucent sheet material. The title or sketch is written or drawn upon the panel 53 and then the slide 49a with the panel 53 mounted within it, is slid into position within the box through the slot 48. The two plys or walls 54 of slide 49a are made with registering apertures 55 which register with the exposure aperture 46 of the mask box 44 when the slide 49a is in position within the latter.

The arm 38 supports the mask box 44 so that its axis, in plan and side elevation, coincides and is in alignment with the optical axis of the camera when the latter occupies the operative position above referred to; that is, when the optical axis a—b, Figure 3, occupies the position in which the axis c—d of tube 20 is shown in said Figure 3. Therefore, when the camera occupies this operative position and a mask, or other kind of slide, is within the exposure opening of the mask box 44 the picture produced upon the film strip will be in accordance with the kind of slide or mask used.

When producing titles on the film strip the title is written or printed on the panel 53 and the camera operated with the slide 49a in position in the mask box and with the camera held pointed toward the sky, or other source of light. As will be clear, adjustment of the mask box 44 toward and from the camera will vary the size of the title as produced upon the film strip.

Of course, in photographing the titles on to the film strip, the operation of the apparatus is carried out the same as in making pictures of other objects or of scenery, and is as follows:—The lever 15 is thrown over into the position shown in Figure 3, and then the camera man, sighting through the eyepiece at the back of the magnifying unit 31, focuses the focusing lens mount 22a onto the title slide at the outer end of the mask box 44. He then notes the setting of the lens mount 22a and adjusts the setting of the lens mount 22 to correspond therewith, after which the lever 15 is thrown over into its opposite position from that shown in Figure 3. This movement of lever 15 shifts slide 6 in a direction to transfer the camera 8 laterally into the position that was occupied by the focusing means at the rear end of the mask box 44. That is, this last movement of lever 15 shifts the optical axis a—b of the camera into the position occupied by the optical axis c—d of the focusing means, as shown in Fig. 3. Operation of the camera then photographs the title on the slide at the outer end of the mask box.

When the apparatus includes only a single transferable focusing mount, then the latter is first placed in position at the front end of tube 20 and after adjusting the same so as to focus it upon the title slide it is transferred to operative position on the camera, after which the camera is positioned with its optical axis opposite the rear end of the mask box 44 by means of handle 15, and the title photographed.

Of course, the focusing portion may be carried out, not by adjustment of the focusing mount on tube 20, but by adjusting the stand 39 lengthwise of the arm 36 toward and from the focusing mount.

Users desiring to photograph autographic memoranda upon the film strip would use ground glass celluloid for the panel 53 on which the wording may be written with pencil which can be erased again with a piece of wet cloth.

A variety of effects in artistic titles can be made by using flickering candle light as a light source or by positioning a light source in certain places back of the title.

For the movie amateurs who make their own home movie scenes the focusing base and title device can be used for different purposes. The scene can be focused properly and can be positioned properly in the view finder 35, but for this purpose the focusing apparatus or device are taken out of the tube 20 and put in place of the view finder in the chamber 35 on the camera. The view finders are then transferred to the tube 20 on the standard which is rotatably connected to the base by means of the screw 19, thus allowing the finder, which now includes the tube 20, to be set at an angle from parallelism with axis a—b, a very important feature when making close-ups or long shots. In fact, this finder, now including the tube 20, can be set to take in exactly the same view as the photo lens on the camera. When using a pair of matched lenses 22 and 22a the usual finder-scope including the chamber 35 is always in operative condition on the camera and the focus can be changed and viewed incidentally by using my new twin lens apparatus.

As an aid in positioning the focusing device carried by the upright 18 when the latter is adjusted angularly on the axis of screw 19 as above described, I provide the base of the upright 18 with a pointer 60 co-operating with an arcuate graduated scale 61 provided on slide 6. Also the slide 6 is herein shown as provided with a stop lug 62 which, by engagement with the side of upright 18, limits the swinging movement of said upright on screw 19 and, when placed against said stop lug, positions the axis c—d parallel with the axis a—b.

As referred to above, the optical system within the tube 20 is so constructed that it may be removed from said tube and transferred to the chamber or tube 35 of the usual sighting device provided as an integral part of the camera. When this is done the front and rear finder lenses of the tube or chamber 35 are transferred to the tube 20 thereby providing a view finder including said tube 20. It will also be clear that the standard or upright 18 which holds the tube 20 is angularly adjustable so that the image seen through the finder can be adjusted to be in line or coincident with the image in the camera, thus avoiding any cut-off portion due to parallax between the image in the camera and the image in the finder of which the tube 20 then forms a part.

What I claim is:

1. A photographic outfit having, in combination, a base; a complete photographic moving picture camera including a photographic lens supported by said base so as to be movable in its entirety back and forth thereon in a direction cross-wise of the optical axis of said camera; means for limiting the movement of said camera in one direction to locate the optical axis of its lens in a definite operative position; means for limiting the movement of said camera in the opposite direction to locate the optical axis of its lens in an inoperative position, and focusing finder means whose optical axis is disposed cross-wise with respect to the direction of movement of the camera, said finder means being also supported by said base and connected with said camera so as to be movable back and forth thereon with the latter so that its optical axis coincides with the aforementioned operative position of the optical axis of the camera when the latter occupies its aforementioned inoperative position, and so that said finder means is shifted aside into another inoperative position when the camera is adjusted on said base to locate its optical axis in said operative position.

2. A photographic outfit having in combination a base; a complete photographic moving picture camera including a photographic lens supported by said base so as to be movable in its entirety back and forth thereon in a direction crosswise of the optical axis of said camera; means for limiting the movement of said camera in one direction to locate the optical axis of its lens in a definite operative position; means for limiting the movement of said camera in the opposite direction to locate the optical axis of its lens in an inoperative position, and finder means including a focusing lens mount whose optical axis is disposed crosswise with respect to the direction of movement of the camera, said finder means being also supported by said base and connected with said camera so as to be movable back and forth thereon with the camera so that its optical axis coincides with the aforementioned operative position of the optical axis of the camera when the latter occupies its aforementioned inoperative position, and so that said finder means is shifted aside into another inoperative position when the camera is adjusted on said base to locate its optical axis in said operative position.

3. A photographic outfit constructed in accordance with claim 1 wherein said camera and said finder means are provided with matched focusing lens mounts disposed directly opposite each other so that either can be located in one definite position by adjustment of said camera and finder means on said base.

4. A photographic outfit constructed in accordance with claim 1 wherein said camera and said finder means are constructed with duplicate lens mount seats disposed directly opposite each other so that either can be located in one definite position by adjustment of said camera and finder means on said base.

5. A photographic outfit constructed in accordance with claim 1 wherein said camera and said finder means are constructed with duplicate lens mount seats disposed directly opposite each other so that either can be located in one definite position by adjustment of said camera and finder means on said base, and including a mask box supported by said base directly in front of said operative position.

6. A photographic outfit constructed in accordance with claim 1 wherein said camera and said finder means are constructed with duplicate lens mount seats disposed directly opposite each other, and including a tubular mask box removably connected with said base and supported by the latter with its axis in a position directly in front of said operative position, said mask box being provided adjacent its front end with means for removably holding a slide.

7. A photographic outfit constructed in accordance with claim 1 wherein said camera and said finder means are constructed with duplicate lens mount seats disposed directly opposite each other, and including a tubular mask box removably mounted on said base and supported by the latter with its axis in a position directly in front of said operative position toward and from which latter the mask box is adjustable, said mask box being provided adjacent its front end with means for removably holding a slide.

8. Moving picture camera apparatus including, in combination, a supporting attachment for a tripod comprising a base provided with means whereby to attach the same to a tripod; a slide movably mounted on said base so as to be reciprocable horizontally thereon; means wherewith to fixedly secure a moving picture camera in its entirety upon said slide in an upstanding position with its optical axis horizontal; focusing finder means independently mounted on said slide alongside of the position occupied by the camera with its optical axis in the plane of movement of the optical axis of said camera; means for limiting the movement of said slide in one direction to locate the optical axis of the lens of said camera in a definite operative position, and means for limiting the movement of said slide in the opposite direction to locate the optical axis of the lens of said finder means in that same operative position, said finder means being constructed with a lens mount seat that is directly opposite the position occupied by the lens mount seat of the camera.

9. Moving picture camera apparatus constructed in accordance with claim 8 wherein the lens mount seat of said finder means is a duplicate of the lens mount seat of the camera to be used with the attachment.

10. Moving picture camera apparatus constructed in accordance with claim 8 and including also a slide-operating hand lever fulcrumed on said base and connected with said slide.

11. Moving picture camera apparatus constructed in accordance with claim 8 and including also means on said base for removably supporting a tubular mask box with its axis parallel with the optical axis of said finder means and said camera and in a position of alignment with and directly in front of the optical axis of the camera when the latter occupies said operative position.

12. Moving picture camera apparatus constructed in accordance with claim 8 and including also a bracket arm separably connected to said base, and a tubular mask box mounted on said bracket arm with its axis parallel with the optical axes of said finder means and said camera and in a position of alignment with and directly in front of the optical axis of the camera when the latter occupies said operative position.

13. A photographic outfit constructed in accordance with claim 1 wherein said finder means includes a tubular member provided at one end with a seat for a focusing lens mount; a pane of ground glass within said tubular member behind said seat; a reversing lens system within said tube directly behind said pane of ground glass, and a magnifying ocular at the opposite end of said tubular member.

14. A photographic outfit having in combination, a base; a slide movably mounted on said base so as to be reciprocable horizontally thereon; means wherewith to secure a moving picture camera upon said slide in an upstanding position with its optical axis horizontal and disposed perpendicularly with relation to the direction of movement of said slide; an upstanding bracket pivotally mounted on said slide alongside of the position occupied by the camera and angularly adjustable on said slide on a vertical axis; finder means mounted upon said upstanding bracket with its optical axis in the same plane with the optical axis of said camera; means for limiting the movement of said slide in one direction to locate the optical axis of the camera in a definite operative position, and means for limiting the movement of said slide in the opposite direction to locate the optical axis of said finder means in that same operative position, said finder means being constructed with a lens mount seat that is directly opposite the position occupied by the lens mount seat of the camera.

15. A photographic outfit constructed in accordance with claim 14 wherein said upstanding bracket is provided with an index co-operating with a graduated scale on said slide.

EMIL M. MUELLER.